US012337202B2

(12) United States Patent
Platzer

(10) Patent No.: US 12,337,202 B2
(45) Date of Patent: Jun. 24, 2025

(54) METHOD AND LIQUID MIXING SYSTEM FOR PROVIDING A LIQUID/FOAM MIXTURE

(71) Applicant: Rosenbauer International AG, Leonding (AT)

(72) Inventor: Lukas Platzer, Leonding (AT)

(73) Assignee: Rosenbauer International AG, Leonding (AT)

( * ) Notice: Subject to any disclaimer, the term of this patent is extended or adjusted under 35 U.S.C. 154(b) by 424 days.

(21) Appl. No.: 17/922,030

(22) PCT Filed: Apr. 28, 2021

(86) PCT No.: PCT/AT2021/060149
§ 371 (c)(1),
(2) Date: Nov. 29, 2022

(87) PCT Pub. No.: WO2021/217193
PCT Pub. Date: Nov. 4, 2021

(65) Prior Publication Data

US 2023/0191174 A1 Jun. 22, 2023

(30) Foreign Application Priority Data

Apr. 29, 2020 (AT) .............................. A 50367/2020

(51) Int. Cl.
*A62C 5/02* (2006.01)
*A62C 5/00* (2006.01)
(Continued)

(52) U.S. Cl.
CPC .............. *A62C 5/022* (2013.01); *A62C 5/002* (2013.01); *A62C 5/008* (2013.01); *B01F 23/2323* (2022.01); *B01F 23/235* (2022.01)

(58) Field of Classification Search
CPC ......... A62C 5/002; A62C 5/008; A62C 5/022; B01F 23/2323; B01F 23/235
(Continued)

(56) References Cited

U.S. PATENT DOCUMENTS 2,769,500 A 11/1956 Clifford
6,973,975 B1 * 12/2005 Adamson ............... A62C 25/00 239/722
(Continued)

FOREIGN PATENT DOCUMENTS

CN 1972731 A 5/2007
CN 201596276 U 10/2010
(Continued)

OTHER PUBLICATIONS

International Search Report in PCT/AT2021/060149, mailed Jul. 26, 2021.

*Primary Examiner* — Charles S Bushey
(74) *Attorney, Agent, or Firm* — Collard & Roe, P.C.

(57) ABSTRACT

A method as well as a liquid mixing system provide a liquid-foam mixture by mixing water with at least one additive. The liquid mixing system includes a water pressure source, an additive reservoir unit, an air compressor unit with a compressor and a drive device, a first and second mixing device, a discharging unit, and multiple different line networks for the respective media. The drive device is formed by a water engine or a water turbine, the water inlet of which is line-connected to the water pressure source.

20 Claims, 2 Drawing Sheets

(51) Int. Cl.
*B01F 23/232* (2022.01)
*B01F 23/235* (2022.01)

(58) Field of Classification Search
USPC .................................................... 261/DIG. 26
See application file for complete search history.

(56) References Cited

U.S. PATENT DOCUMENTS

| | | | | |
|---|---|---|---|---|
| 8,701,789 | B2 | 4/2014 | Kruger et al. | |
| 2003/0146522 | A1* | 8/2003 | Crawley ............ | B01F 35/2211 261/DIG. 26 |
| 2004/0177975 | A1 | 9/2004 | Laskaris et al. | |
| 2008/0236846 | A1 | 10/2008 | Gamble et al. | |
| 2010/0193201 | A1 | 8/2010 | Zeller | |
| 2013/0253711 | A1 | 9/2013 | McLoughlin et al. | |
| 2020/0147428 | A1 | 5/2020 | Burdin | |

FOREIGN PATENT DOCUMENTS

| | | | |
|---|---|---|---|
| CN | 103629054 | A | 3/2014 |
| CN | 107158610 | A | 9/2017 |
| CN | 107349544 | A | 11/2017 |
| CN | 208145269 | U | 11/2018 |
| EP | 3 639 898 | A1 | 4/2020 |
| GB | 967 792 | A | 8/1964 |
| WO | 2008/118408 | A1 | 10/2008 |

* cited by examiner

METHOD AND LIQUID MIXING SYSTEM FOR PROVIDING A LIQUID/FOAM MIXTURE

CROSS REFERENCE TO RELATED APPLICATIONS

This application is the National Stage of PCT/AT2021/060149 filed on Apr. 28, 2021, which claims priority under 35 U.S.C. § 119 of Austrian Application No. A50367/2020 filed on Apr. 29, 2020, the disclosure of which is incorporated by reference. The international application under PCT article 21(2) was not published in English.

BACKGROUND OF THE INVENTION

1. Field of the Invention

The invention relates to a method for providing a liquid-foam mixture by means of a liquid mixing system. However, the invention further also relates to a liquid mixing system for providing the liquid-foam mixture, which is created by mixing water with at least one additive.

EP 3 639 898 A1 describes a mobile fire extinguisher with a foam generation by means of a foam generating compression method. The extinguishing water is fed from a separate extinguishing water pump or feed water pump to a mixing device. By means of a separate drive motor, a first hydraulic pump and a second hydraulic pump are driven, wherein the hydraulic pumps are driven by the drive motor discretely and independently of the extinguishing water pump or the feed water pump. The drive motor for the hydraulic pumps is, in this regard, formed by a combustion engine or an electric motor. A first hydraulic motor is driven by the first hydraulic pump by means of a hydraulic oil, wherein an air compressor is driven by the first hydraulic motor. The generated compressed air is fed to the mixing device via a compressed air line. A second hydraulic motor is driven by the second hydraulic pump by means of a hydraulic oil, wherein a foam pump is driven by the second hydraulic motor. The foaming agent is accommodated in a container and is also fed to the mixing device via the foam pump. Following the mixing device, an output device for discharging the previously produced extinguishing water foaming mixture is arranged.

U.S. Pat. No. 2,769,500 A also describes a foam generating device for firefighting. Air is sucked in by a drive device configured as a gas turbine, and said air is compressed by a compressor. The drive device is further drive-connected to a pump via a gear arrangement. A first mixing device is located upstream of the pump when viewed in the direction of flow, in which mixing device a foaming agent stored in a container is admixed into the water sucked in by the pump. The mixture of water and foaming agent is fed, via a pipeline, to a double-walled body by means of the pump. The body comprises an outer housing and a hollow inner cylinder, wherein the mixture of water and foaming agent is introduced into the inner cylinder. The air compressed by the compressor is introduced into an annular intermediate space between the outer housing and the inner cylinder of the body, in which intermediate space it is conducted, together with the mixture of water and foaming agent escaping from the inner cylinder, to an outlet. The outlet is connected to a hose, which ends in a nozzle, wherein the hose serves as a foam mixing space, in which the air and the mixture of water and foaming agent are combined.

2. Description of the Related Art

GB 967 792 A1 describes a unit for producing an extinguishing foam for firefighting, which unit can be mounted on a vehicle or a helicopter. The unit for producing the extinguishing foam comprises a water reservoir, a foam compound container, and a compressor. The foam compound container is arranged inside the water reservoir. An air supply line extends above the water reservoir, starting from the compressor, and is separately flow-connected to both the interior of the water reservoir and the interior of the foam compound container. Moreover, a mixing device is provided, which is flow-connected to the interior of the water reservoir, the interior of the foam compound container, and also to the air supply line, in each case via a separate connecting line. The compressor is operated either using a fuel for combustion, or the compressed air from the turbine of the helicopter is channeled off. The disadvantage of this is that the required compressed air is generated by means of a combustion engine on site and thus, additional environmental pollution is caused by the exhaust gases.

SUMMARY OF THE INVENTION

The object of the present invention was to overcome the shortcomings of the prior art and to provide a method and a liquid mixing system, by means of which a user is able to carry out an autonomous operation and in this process, no engine has to be used for directly driving the compressor of the air compression unit of the liquid mixing system.

This object is achieved by a method for providing a liquid-foam mixture and a liquid mixing system configured therefor according to the claims.

The method serves to provide a liquid-foam mixture by mixing water with at least one additive by means of a liquid mixing system, in which the following steps are carried out:

- providing a water pressure source for discharging the water,
- providing at least one first additive reservoir unit with a first additive accommodated therein,
- providing an air compressor unit for providing compressed air, comprising a compressor and a drive device, wherein the drive device is drive-connected to the compressor,
- providing a first mixing device having a first mixing chamber for admixing at least the first additive to the water discharged from the water pressure source,
- providing a second mixing device with a second mixing chamber for optionally admixing compressed air to the liquid-foam mixture discharged from the first mixing device, and a connecting line connecting the two mixing devices to one another,
- providing a discharging unit for discharging the liquid-foam mixture, having a connection device and a discharge line, by means of which discharge line the connection device is line-connected to the mixing devices,
- providing a water line network with at least a first water feed line, by means of which first water feed line the first mixing device is line-connected to the water pressure source,
- providing an additive line network with at least a first additive line, by means of which first additive line the first additive reservoir unit is line-connected to the first mixing device, providing a compressed air line network with a first compressed air line, by means of which first compressed air line the second mixing device is optionally line-connected to the compressor, feeding the water from the water pressure source to the first mixing device via the first water feed line, feeding at least the first additive from the first additive reservoir unit to the first mixing device via the first additive line, mixing the water with the at least one additive by means of the first mixing device and forwarding the liquid-foam mixture to the discharging unit and discharging the liquid-foam mixture from the connection device, wherein it is further provided:

that the drive device of the air compressor unit is formed by a water engine or a water turbine comprising at least one water inlet and at least one outlet, that a second water feed line is provided, and the at least one water inlet of the water engine or the water turbine is line-connected to the water pressure source via the second water feed line, and that the water discharged from the water pressure source is fed to the water engine or the water turbine via the second water feed line, and the water engine or the water turbine is driven by the pressurized water of the water pressure source.

The advantage of the method steps selected here consists in that due to the compact design of the liquid mixing system, no additional engine to be operated has to be provided for driving the compressor for providing compressed air. In fire or assistance operations, water is almost always necessary as an extinguishing agent. Depending on the available pressure source, said water is also available at a sufficiently high pressure level. By providing a water engine or a water turbine for driving the compressor, the present water pressure is also used for this purpose. Thus, the water pressure is used for the discharge and simultaneous admixing of the at least one additive, on the one hand, and also for driving the compressor, on the other hand. By providing the water pressure source and/or connecting it to the liquid mixing system, the operation is started, and at least one additive is added or admixed to the water flowing through. If there is an additional need for compressed air, which is to be added to the liquid-foam mixture, it is also readily available due to the water drive of the compressor. This not only creates a compact assembly unit but also accounts for environmental considerations, as providing the compressed air does not require the operation of an additional engine, which is often and mostly formed by a combustion engine. A further advantage consists in that this also allows economizing inspection and/or service work, as they are required and often also mandatory for engines, in particular in connection with hydraulic drives. Selecting the materials accordingly furthermore creates a durable and above all low-maintenance liquid mixing system.

A further possible advantageous approach provides that a first additive conveying device, in particular a conveyor pump driven by compressed air, for the first additive reservoir unit and a second compressed air line are provided, by means of which second compressed air line the compressor is line-connected to the first additive conveying device of the first additive reservoir unit, and in this process, the first additive conveying device of the first additive reservoir unit is driven by the compressed air fed in the second compressed air line, and in this process, the first additive is taken from a first additive reservoir and is conveyed to the first mixing device via the first additive line. Thus, an even simpler and more environmentally friendly operation of the liquid mixing system can be achieved. The compressed air is provided at least for admixing it to the liquid-foam mixture before discharge from the discharging device and can additionally also be used to operate and admix the additive to the water.

Moreover, an approach is advantageous, in which the water of the water pressure source is taken from a water reservoir having a water pump, an open body of water using a water pump, a hydrant, and/or a water reservoir applied with a pressure medium. This way, it is possible to draw on all those commonly different available water pressure sources during an operation. A combination of the water pressure sources would also be possible and conceivable in order to be able to provide sufficient quantities of the liquid-foam mixture for an operation.

A further advantageous approach is characterized in that the water escaping from the at least one water outlet of the water engine or the water turbine is drained into the open. This may take place when a sufficient quantity of water is available.

A method variant, in which at least one water return line is provided, and the water escaping from the at least one water outlet of the water engine or the water turbine is returned to the water pressure source, in particular into its unpressurized section, via the water return line, and is discharged back to the water engine or the water turbine by said water pressure source, is also advantageous. Thus, the water flow can be realized for the water drive in an almost to completely closed loop. Furthermore, this also allows achieving an even more economical operation of the liquid mixing system.

Moreover, an approach may be advantageous, in which a differential pressure regulating member is arranged in the second compressed air line, by which differential pressure regulating member the water pressure in the first water feed line is determined, and the pressure level of the compressed air fed to the additive conveying device is set based on the determined water pressure. Thereby, the pressure level for the operation of the first additive reservoir unit with its first additive conveying device can be adjusted and/or controlled precisely depending on the water pressure in the water feed line towards the first mixing device.

Moreover, an approach is advantageous, in which a second additive reservoir unit with a second additive conveying device and a second additive reservoir with a second additive accommodated therein is provided, and the compressed air is fed and driven from the compressor to the second additive conveying device via a third compressed air line, and in this process, the second additive is taken from the second additive reservoir and conveyed to the first mixing device via a second additive line. Depending on the additive used or required, the available quantity can thus be increased, and no changeover times and downtimes relating thereto occur. However, this may also create the possibility to be able to admix and/or add different additives to the water.

A different approach is characterized in that the volume flow of the liquid-foam mixture fed to the second mixing chamber of the second mixing device is adjusted manually and/or pneumatically. Thus, the subsequent process of adding compressed air can be adjusted and predetermined even more precisely.

A further advantageous approach is characterized in that the water is discharged from the water pressure source with a pressure value selected from a pressure value range with a lower limit of 6 bar, preferably 9 bar, and an upper limit of 20 bar, in particular 12 bar. Thus, the volume flows and the admixing rates can be varied within a wide range.

Another method variant, in which the water engine or the water turbine is fed the water with a volume flow selected from a volume flow value range with a lower limit of 400 l/min, preferably 500 l/min, and an upper limit of 2,000 l/min, preferably 1,000 l/min, is also advantageous. Thus, the drive power can be adapted to the required operation conditions depending on the volume flow.

However, the object of the invention may also be achieved independently thereof by a liquid mixing system for providing a liquid-foam mixture, which is created by mixing water with at least one additive. The liquid mixing system comprises

- a water pressure source, which water pressure source is configured to discharge the water,
- at least one first additive reservoir unit, which first additive reservoir unit is configured to accommodate a first additive,
- an air compressor unit comprising a compressor and a drive device, wherein the drive device is drive-connected to the compressor, and wherein the air compressor unit is configured to provide compressed air,
- a first mixing device having a first mixing chamber, which first mixing device is configured to optionally admix at least first additive to the water discharged from the water pressure source,
- a second mixing device having a second mixing chamber, which second mixing device is configured to optionally admix compressed air to the liquid-foam mixture discharged from the first mixing device, and a connecting line connecting the two mixing devices to one another,
- a discharging unit having a connection device and a discharge line, by means of which discharge line the connection device is line-connected to the mixing devices, wherein the discharging unit is configured to discharge the liquid-foam mixture,
- a water line network having at least a first water feed line, by means of which first water feed line the first mixing device is line-connected to the water pressure source,
- an additive line network having at least a first additive line, by means of which first additive line the first additive reservoir unit is line-connected to the first mixing device,
- a compressed air line network having a first compressed air line, by means of which first compressed air line the second mixing device is optionally line-connected to the compressor, wherein it is further provided:
- that the drive device of the air compressor unit is formed by a water engine or a water turbine comprising at least one water inlet and at least one water outlet,
- that a second water feed line is provided, and
- that the at least one water inlet of the water engine or the water turbine is line-connected to the water pressure source via the second water feed line, wherein the water engine or the water turbine can be driven by the pressurized water of the water pressure source to be discharged from the water pressure source.

The advantage achieved thereby consists in that, due to the compact design of the liquid mixing system, no additional engine to be operated is to be provided for driving the compressor, which serves to provide compressed air. In fire or assistance operations, water is almost always required as an extinguishing agent. Depending on the available pressure source, the water is also available at a sufficiently high pressure level. By providing a water engine or a water turbine for driving the compressor, the present water pressure is also used for this purpose. Thus, the water pressure is used for the discharge and simultaneous admixing of the at least one additive, on the one hand, and for driving the compressor, on the other hand. By connecting the water pressure source to the liquid mixing system, the operation is started, and at least one additive is added or admixed to the water flowing through. If there is an additional need for compressed air, which is to be added to the liquid-foam mixture, it is also readily available due to the water drive of the compressor. This not only creates a compact assembly unit but also accounts for environmental considerations, as providing the compressed air does not require the operation of an additional engine.

A possible further preferred embodiment is characterized in that furthermore, a first additive conveying device, in particular a conveying pump drivable by means of compressed air, a first additive reservoir at the first additive reservoir unit for accommodating the first additive, and a second compressed air line are provided, by means of which second compressed air line the compressor is line-connected to the first additive conveying device of the first additive reservoir unit, and that the first additive reservoir is line-connected to the first mixing device via the first additive conveying device and the first additive line. Thus, an even simpler and more environmentally friendly operation of the liquid mixing system can be achieved. The compressed air is provided at least for admixing compressed air to the liquid-foam mixture before discharge and can additionally also serve to operate and admix the additive to the water.

Moreover, it may be advantageous if the water pressure source is selected from the group of water reservoir having a water pump, open body of water and water pump, hydrant, a water reservoir applied with a pressure medium. This way, it is possible to draw on those commonly different water pressure sources during an operation. A combination of the water pressure sources would also be possible and conceivable in order to be able to sufficiently provide the liquid-foam mixture for an operation.

A different embodiment is characterized in that the at least one water outlet of the water engine or the water turbine opens to the outside. This may take place when a sufficient quantity of water is available and there is no risk of too great of a water damage in the surrounding areas.

A further possible embodiment has the features that the water line network comprises at least a first water return line, by means of which first water return line the at least one water outlet of the water engine or the water turbine is line-connected to the water pressure source, in particular to its unpressurized section. Thus, an almost closed loop for the water supply and return lines can be realized. Furthermore, this also allows achieving an even more economical operation of the liquid mixing system.

A further embodiment provides that a differential pressure regulating member and a measuring line are provided, which differential pressure regulating member is arranged in the second compressed air line, and the measuring line is line-connected to the first water feed line starting from the differential pressure regulating member, and that the differential pressure regulating member is configured to determine the water pressure in the first water feed line, and the pressure level of the compressed air fed to the additive conveying device is adjustable based on the determined water pressure. Thereby, the pressure level for the operation of the first additive reservoir unit with its first additive conveying device can be adjusted and/or controlled precisely depending on the water pressure in the water feed line towards the first mixing device.

A different embodiment is characterized in that a second additive reservoir unit with a second additive conveying device and a second additive reservoir for accommodating a second additive is provided, and that the compressor is line-connected to the second additive conveying device via a third compressed air line, and furthermore, the second additive reservoir is line-connected to the first mixing device via the second additive conveying device and a second additive line. Depending on the additive used or required, the available quantity can thus be increased, and no change-over times and downtimes relating thereto occur. However, this may also create the possibility to be able to admix or add different additives to the water.

A further preferred embodiment is characterized in that the first mixing device is formed by a venturi nozzle arrangement. This way, a certain natural aspiration effect of the at least one additive can be achieved due to the water current and the vacuum generated thereby.

Moreover, it may be advantageous if the second mixing device comprises an actuating means, which actuating means is designed for adjusting the volume flow of the liquid-foam mixture fed to the second mixing chamber of the second mixing device. With the additional provision of the actuating means, the subsequent process of adding compressed air can be adjusted and predetermined even more precisely.

A further possible and possibly alternative embodiment has the features that the liquid mixing system is built on a base frame as a compact assembly unit. Thus, a simple and safe transport option for the entire liquid mixing system can be created.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The term "in particular" shall henceforth be understood to mean that it may refer to a possible more specific formation or more detailed specification of an object or a process step, but need not necessarily depict a mandatory, preferred embodiment of same or a mandatory practice. A further term used is "optional". This is understood to mean that this method step or this system component is principally present but depending on the operating conditions may be used although that does not necessarily have to be the case.

In the following, the term "liquid mixing system" is also used. This is understood to mean that by means of this system, at least one additive can be admixed to an extinguishing fluid, preferably water. For example a foaming agent or also other additives or media can be admixed or added as an additive. The so-called expansion ratio indicates the ratio between the volume of the water-foaming agent mixture and the foaming agent volume. It indicates by what factor the quantity of the liquid has increased upon foaming. The discharged liquid-foam mixture can be divided into low-expansion foams, medium-expansion foams, and high-expansion foams, depending on the expansion ratio.

An engine is generally understood to be a machine transforming a form of energy, namely chemical, thermal, or electric energy, into mechanical work by performing movement directed against a force. Engines are above all used for driving work machines such as pumps, blowers, compressors, and tools as well as for vehicles. Often, the engines are also referred to as motors.

Figure 1:
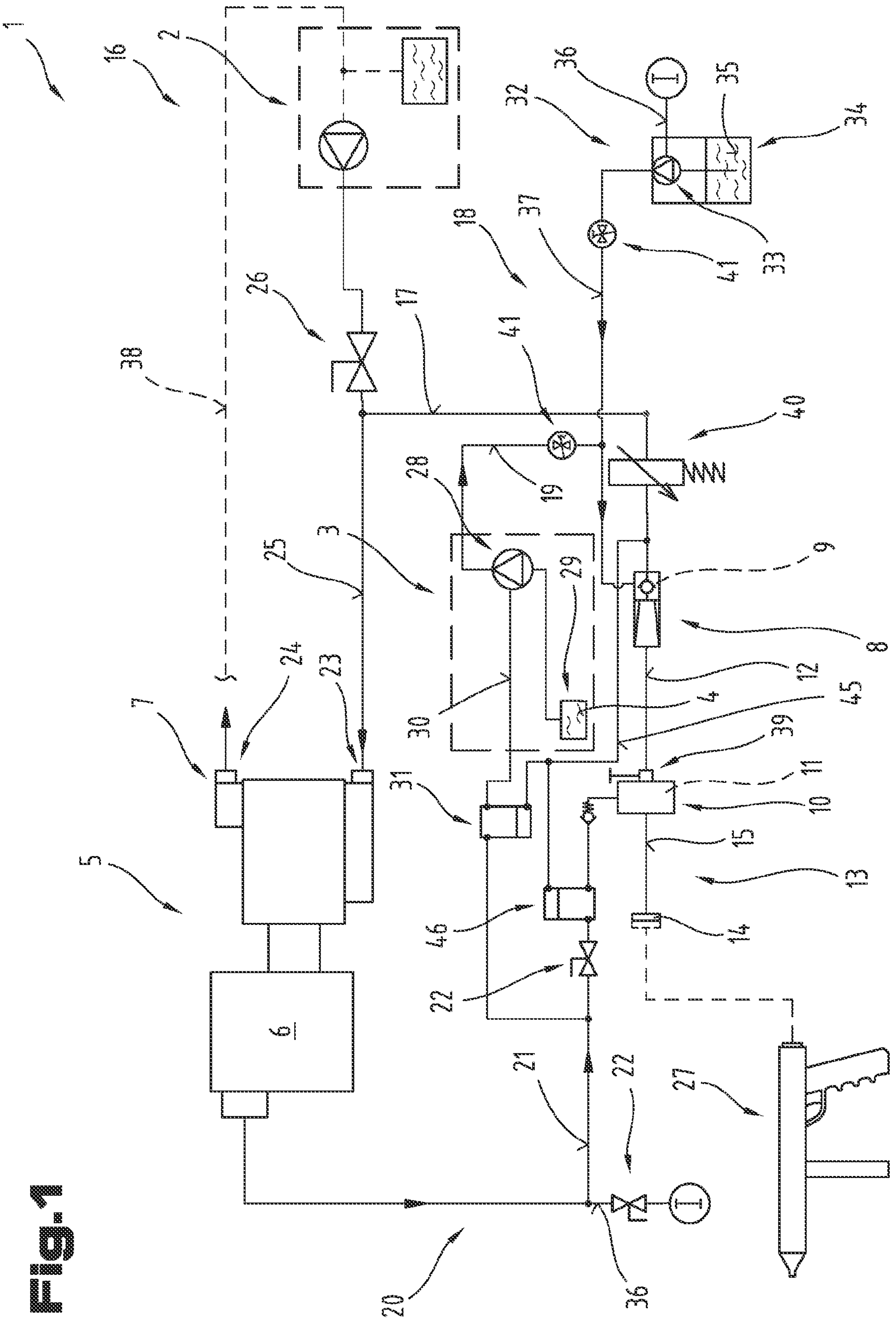
FIG. 1 a flow scheme of a possible embodiment of a liquid mixing system.

FIG. 1 shows an exemplary embodiment of a liquid mixing system 1 in the form of a simplified flow scheme and/or diagram. It is provided that, the use of engines for driving system components of the liquid mixing system 1 is to be dispensed with so far as it is possible, but preferably completely. As already preliminarily mentioned, at least one additive can be added to the water commonly used as the extinguishing agent before discharge, in order to increase the extinguishing effect and/or to impede or prevent the admission of ambient air (oxygen) to the fire to be extinguished.

For the liquid mixing system 1, a component generally referred to as water pressure source 2 is necessary, which provides the water and is configured to discharge the water. It is also possible that multiple water pressure sources 2 cooperate for providing and discharging the water. The water pressure source 2 may be selected from or formed of the group of water reservoir having a water pump, open body of water and water pump, hydrant, a water reservoir applied with a pressure medium. For the sake of simplicity, the water pressure source 2 is schematically shown as a circle containing a triangle. Depending on the type of water pressure source 2, the water can be discharged therefrom with a pressure value selected from a pressure value range with a lower limit of 6 bar, preferably 9 bar, and an upper limit of 20 bar, in particular 12 bar. Moreover, the volume flow of the discharged water can be selected from a volume flow value range with a lower limit of 400 l/min, preferably 500 l/min, and an upper limit of 2,000 l/min, preferably 1,000 l/min. The higher the selected value of the volume flow, the "wetter" the discharged liquid-foam mixture becomes.

Moreover, the liquid mixing system 1 comprises a first additive reservoir unit 3 with a first additive 4 accommodated therein and provided for discharge and mixing and/or admixing. An air compressor unit 5 is also provided, which is configured to and/or serves to provide compressed air. The air compressor unit 5 itself comprises a compressor 6 and a drive device 7 driving the same, which drive device 7 is drive-connected to the compressor.

In order to mix the first additive 4 into or admix it with the water stream discharged from the water pressure source 2, a first mixing device 8 having a first mixing chamber 9 is furthermore provided. The first mixing device 8 may be formed, for example, by a Venturi nozzle arrangement.

Preferably yet not necessarily, a second mixing device 10 having a second mixing chamber 11 may be provided. By means of the second mixing device 10, it is optionally also possible to additionally admix or add compressed air with/to the liquid-foam mixture discharged from the first mixing device 8. If the second mixing device 10 is provided, a connecting line 12 connecting the two mixing devices 8, 10 is to be provided. In this regard, it may further be advantageous if the volume flow of the liquid-foam mixture fed to the second mixing chamber 11 of the second mixing device 10 is adjusted manually and/or pneumatically. For this purpose, the second mixing device 10 may comprise at least one actuating means or at least one actuator member 39, which is configured to adjust the volume flow of the liquid-foam mixture fed to the second mixing chamber 11 of the second mixing device 10, The actuating means or the actuator member 39 is adumbrated in a schematically simplified manner and may also be arranged inside the second mixing device 10.

In order to discharge the liquid-foam mixture and possibly connect hoses or lines to the liquid mixing system 1, it also comprises a discharging unit 13, which in turn comprises a connection device 14 and a discharge line 15. The discharging unit 13 is line connected to the second mixing device 10, if provided, and in further consequence with the first mixing device 8 via the discharge line 15. This may be the case possibly via the connecting line 12.

In order to be able to establish or form line connections between the separate system components, separate line networks are further provided depending on the medium to be fed through. Suitable lines for each of the media, namely the water, the compressed air, and the additive are described in the following.

A water line network 16 comprises at least one first water feed line 17, which flow-connects the water pressure source 2 to the first mixing device 8, wherein they are line-connected to one another.

An additive line network 18 comprising a first additive line 19 is also provided. The first additive line 19 forms a line connection between the first additive reservoir unit 3 and the first mixing device 8. In order to be able to guide the compressed air provided by the compressor 6 to the system component intended therefor or to the intended system components, a compressed air line network 20 comprising a first compressed air line 21 is also provided. In the present exemplary embodiment, the first compressed air line 21 connects the compressor 6 to the second mixing device. By means of an actuator or control member 22, the quantity of compressed air and/or the compressed air volume flow fed to the second mixing device 10 can be controlled or adjusted. This may optionally take place such that no compressed air at all is fed to the second mixing device 10 or the volume flow is increased depending on the desired air admixture. Most times, this takes place by means of manual adjustment.

In order to drive the compressor 6, the previously described drive device 7 is provided, which, in the present exemplary embodiment, is formed by a water engine or a water turbine. The water engine or the water turbine has, in each case, at least one water inlet 23 and at least one water outlet 24. For supplying the water engine or the water turbine, a second water feed line 25 is provided, which in turn connects the water inlet 23 to the water pressure source 2 in terms of flow. For adjusting the volume flow, a further actuator or control member 26 may be provided, which is formed as a ball valve, for example. With this, the water supply both to the first mixing device 8 and to the water inlet 23 of the water engine or the water turbine can be released or prevented.

If the pressurized water is fed or supplied to the water engine or the water turbine, the water engine or the water turbine consequently drives the compressor 6 providing the compressed air. In this case, the water mostly available in a pressurized state may also be serve as a drive medium for the water engine or the water turbine, and the compressed air may be used at least for optionally operating the second mixing device 10.

If the pressurized water is then fed from the water pressure source 2 to the first mixing device 8 via the first water feed line 17, at least the first additive 4 may optionally also be fed to the first mixing device 8 starting from the first additive reservoir unit 3, where it is mixed with the water or added to the water. The liquid-foam mixture is then forwarded to the discharging unit 13 from where it is forwarded to a jet pipe 27, which may also be referred to as extinguishing pistol or piercing nozzle and is subsequently connected thereto e.g. by means of an extinguishing line for the fire-fighting operation.

Furthermore, it may be advantageous if, for conveying the first additive 4 from the first additive reservoir unit 3 towards the first mixing device 8, the compressed air provided by the compressor 6 is also used. For this purpose, the first additive reservoir unit 3 comprises a first additive conveying device 28 and a first additive reservoir 29 for accommodating and storing the first additive 4. The first additive conveying device 28 may be formed by a conveyor pump driven by the compressed air, for example. For supplying the compressed air, the compressed air line network 20 comprises a second compressed air line 30, which flow-connects the compressor 6 to the first additive compressed air 28. The first additive reservoir 29 is line-connected to the first mixing device 8 via the first additive conveying device 28 and the first additive line 19. When the first additive reservoir unit 3 is in operation, the first additive conveying device 28 is driven by the compressed air fed in through the second compressed air line 30, and in this process, the first additive 4 is taken from the first additive reservoir 29 and fed into the first mixing device 8 via the first additive line 19. The removal may take place, for example, during a suction process.

At least one differential pressure regulating member 31 may also be provided, which in the exemplary embodiment shown, is arranged in the second compressed air line 30. The differential pressure regulating member 31 itself further has a line connection and/or communication connection to the first water feed line 17 via a measuring line 45. The measuring line 45 may also be referred to as reference pressure line, by means of which the current internal pressure (water pressure) inside the first water feed line 17 is transmitted to the differential pressure regulating member 31. If the pressure regulating member 40, described below in more detail, in the water feed line 17 for adjusting and controlling the water from the water pressure source 2 supplied or fed to the first mixing device 8 is provided, the pressure downstream of the pressure regulating member 40 is determined and used for controlling the air pressure forwarded to the first additive conveying device 28 in the second compressed air line 30.

The differential pressure regulating member 31 is configured to determine the water pressure in the first water feed line 17, wherein, based on the determined water pressure, the pressure level of the compressed air fed to the additive conveying device 28 is adjusted by the differential pressure regulating member 31 in the following second compressed air line 30 leading to the first additive conveying device 28. Thus, the pressure of the compressed air in the second compressed air line 30, which is forwarded to the first additive conveying device 28, can be adjusted by the differential pressure regulating member 31 depending on the pressure of the water in the first water feed line 17.

Additionally, a second additive reservoir unit 32 may also be provided, which comprises a second additive conveying device 33 and a second additive reservoir 34. In the second additive reservoir 34, a second additive 35 is accommodated or stored. The second additive conveying device 33 can be line-connected to the compressor 6 by means of a third compressed air line 36. For controlling and adjusting the pressure of the compressed air, a further differential pressure regulating member, which is not shown or described in detail, may be provided, which further differential pressure regulating member may be designed analogously to the previously described differential pressure regulating member 31 in the second compressed air line 30. This possible additional differential pressure regulating member may be arranged between the two "I" in the circle, representing a line connection, in the third compressed air line 36, which is shown only in sections for the sake of clarity.

The second additive reservoir 34 is line-connected to the first mixing device 8 via the second additive conveying device 33 and a second additive line 37. The second additive conveying device 33 is driven by the compressed air provided by the compressor 6, wherein the second additive 35 is taken from the second additive reservoir 34 and fed to the first mixing device 8 by means of the second additive conveying device 33 via the second additive line 37. The previously described additive conveying devices 28, 33 may be formed e.g. of compressed air membrane pumps or the like.

However, it would also be possible to provide the second additive reservoir unit 32 while provided a drive type deviating therefrom. However, the same also applies to the previously described first additive reservoir unit 3.

The additive or the additives may also be referred to as admixtures. Depending on requirements and operating conditions, the additive or the admixture may be selected from the group consisting of solid granulate material, abrasive agent, extinguishing powder, extinguishing additive, foaming agent, dry ice, decontamination agent, or the like.

The water required for the drive by and fed to the water engine or the water turbine may be conducted into the open after drive and escaping from the water outlet 24. Independently thereof, it would, however, also be possible to provide at least one water return line 38 in the water line network 16. The water return line 38 forms a flow connection between the water outlet 24 of the water engine or the water turbine and the water pressure source 2. Thus, the water escaping from the at least one water outlet 24 can be conducted back to the water pressure source 2, in particular in its unpressurized section, via the water return line 38 and subsequently be discharged again to the water engine or the water turbine. That water pressure of the water, which is present at the first mixing device 8 which is flown through by the water, can be adjusted and controlled by means of a pressure regulating member 40. Most times, this takes place with a manual adjusting action by operating personnel intended or trained therefor.

As described above, at least one additive 4, 35 may be admixed into or added to the water or extinguishing water. In order to be able to preset, in each case, the admixture ratio for the respective additive 4, 35, a separate adjusting member 41 may be arranged or provided in each of the first additive line 19 and/or also in the second additive line 37, as is adumbrated. The two previously described additive conveying devices 28, 33 are preferably operated by the compressed air provided by the compressor 6, although this does not have to take place necessarily.

Admixing and transporting the at least one additive 4, 35 form its respective additive reservoir unit 3, 32 does not have to take place necessarily with one of the previously described additive conveying devices 28, 33, but may also be carried out using other devices or system components. For this purpose, an engine or the like may also be used, although this is to be avoided due to environmental reasons.

In order to be able to also adapt the pressure, at which the air compressed by the compressor 6 is fed to the second mixing device 10 in the first compressed air line 21, to the respective current water pressure in the first water feed line 17, a separate or additional further differential pressure regulating member 46 may be arranged or provided in the first compressed air line 21 between the control member 22 and the second mixing device 10. The measuring line 45 required for this can be branched off from the first measuring line 45 described above. Thus, the further differential pressure regulating member 46 is also communication-connected or flow-connected to the first water feed line 17 via the measuring line 45.

Figure 2:
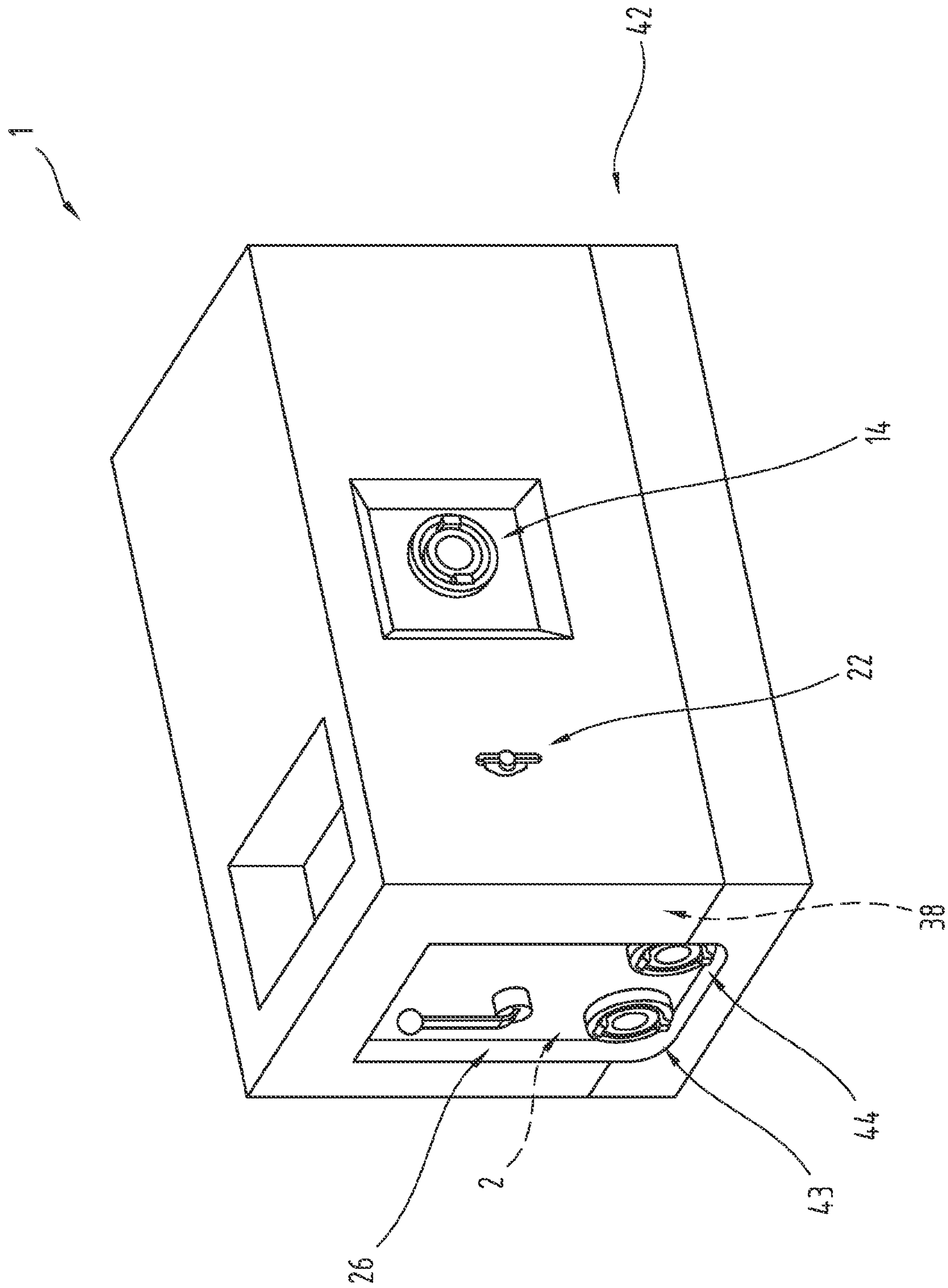
FIG. 2 the compact-design liquid mixing system, which is mounted on a base frame, in a stylized, diagrammatic representation.

FIG. 2 also shows, in a stylized manner, the liquid mixing system 1 in the form of a box-shaped structure, which is mounted on and affixed to a base frame 42 as a compact assembly unit. For connecting the water pressure source 2, a coupling device 43 is provided, wherein the water return line 38 ends at a further coupling device 44. Furthermore, the control member 26, which may also be referred to as actuator member, can be seen, which adjusts or controls the water intake to the previously described system components located downstream. This compact-design liquid mixing system 1 may preferably also be formed or referred to as a mobile and thus easy-to-transport emergency aggregate.

The method serves to provide a liquid-foam mixture by mixing water with at least one additive 4, 35 by means of the liquid mixing system 1, in which the following steps are carried out:

- providing the water pressure source 2 for discharging the water,
- providing at least one first additive reservoir unit 3 with the first additive 4 accommodated therein,
- providing the air compressor unit 5 for providing compressed air, comprising the compressor 6 and the drive device 7, wherein the drive device 7 is drive-connected to the compressor 6,
- providing the first mixing device 8 with the first mixing chamber 9 for admixing at least the first additive 4 to the water discharged from the water pressure source 2,
- providing the second mixing device 10 with a second mixing chamber 11 for optionally admixing compressed air to the liquid-foam mixture discharged from the first mixing device 8, and a connecting line 12 connecting the two mixing devices 8, 10 to one another,
- providing the discharging unit 13 for discharging the liquid-foam mixture with the connection device 14 and the discharge line 15, by means of which discharge line 15 the connection device 14 is line-connected to the mixing devices 8, 10,
- providing the water line network 16 with at least one first water feed line 17, by means of which first water feed line 17 the first mixing device 8 is line-connected to the water pressure source 2,
- providing the additive line network 18 with at least one first additive line 19, by means of which first additive line 19 the first additive reservoir unit 3 is line-connected to the first mixing device 8, providing the compressed air line network 20 with the first compressed air line 21, by means of which compressed air line 21 the second mixing device 10 is optionally line-connected to the compressor 6, feeding the water from the water pressure source 2 to the first mixing device 8 via the first water feed line 17, feeding at least the first additive 4 from the first additive reservoir unit 3 to the first mixing device 8 via the first additive line 19, mixing the water with the at least one additive 4 by means of the first mixing device 8 and forwarding the liquid-foam mixture to the discharging unit 13 and discharging the liquid-foam mixture from the connection device 14, wherein it is further provided that the drive device 7 of the air compressor unit 5 is formed by a water engine or a water turbine comprising at least the water inlet 23 and at least the water outlet 24, that the second water feed line 25 is provided, and the at least one water inlet 23 of the water engine or the water turbine is line-connected to the water pressure source 2 via the second water feed line 25, and that the water from the water pressure source 2 is fed to the water engine or the water turbine via the second water feed line 25, and the water engine or the water turbine is driven by pressurized water.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

The invention claimed is:

1. A method for providing a liquid-foam mixture by mixing water with at least one additive (4, 35) by means of a liquid mixing system (1), in which the following steps are carried out:

providing a water pressure source (2) for discharging the water, providing at least one first additive reservoir unit (3) with a first additive (4) accommodated therein, providing an air compressor unit (5) for providing compressed air, comprising a compressor (6) and a drive device (7), wherein the drive device (7) is drive-connected to the compressor (6), providing a first mixing device (8) with a first mixing chamber (9) for admixing at least the first additive (4) to the water discharged from the water pressure source (2), providing a second mixing device (10) with a second mixing chamber (11) for optionally admixing compressed air to the liquid-foam mixture discharged from the first mixing device (8), and a connecting line (12) connecting the two mixing devices (8, 10) to one another, providing a discharging unit (13) for discharging the liquid-foam mixture with a connection device (14) and a discharge line (15), by means of which discharge line (15) the connection device (14) is line-connected to the mixing devices (8, 10), providing a water line network (16) with at least one first water feed line (17), by means of which first water feed line (17) the first mixing device (8) is line-connected to the water pressure source (2), providing an additive line network (18) with at least one first additive line (19), by means of which first additive line (19) the first additive reservoir unit (3) is line-connected to the first mixing device (8), providing a compressed air line network (20) with a first compressed air line (21), by means of which compressed air line (21) the second mixing device (10) is optionally line-connected to the compressor (6), feeding the water from the water pressure source (2) to the first mixing device (8) via the first water feed line (17), feeding at least the first additive (4) from the first additive reservoir unit (3) to the first mixing device (8) via the first additive line (19), mixing the water with the at least one additive (4) by means of the first mixing device (8) and forwarding the liquid-foam mixture from the connection device (14) to the discharging unit (13), wherein the drive device (7) of the air compressor unit (5) is formed by a water engine or a water turbine comprising at least one water inlet (23) and at least one water outlet (24), a second water feed line (25) is provided, and the at least one water inlet (23) of the water engine or the water turbine is line-connected to the water pressure source (2) via the second water feed line (25), and the water discharged from the water pressure source (2) is fed to the water engine or the water turbine via the second water feed line (25), and the water engine or the water turbine is driven by pressurized water of the water pressure source (2).

2. The method according to claim 1, wherein a first additive conveying device (28) for the first additive reservoir unit (3) and a second compressed air line (30) are provided, by means of which second compressed air line (30) the compressor (6) is line-connected to the first additive conveying device (28) of the first additive reservoir unit (29), and in this regard, the first additive conveying device (28) of the first additive reservoir unit (3) is driven by the compressed air fed in the second compressed air line (30), and in this regard, the first additive (4) is taken from a first additive reservoir (29) and is conveyed to the first mixing device (8) via the first additive line (19).

3. The method according to claim 1, wherein the water of the water pressure source (2) is taken from a water reservoir having a water pump, an open body of water using a water pump, a hydrant, and/or a water reservoir applied with a pressure medium.

4. The method according to claim 1, wherein the water escaping from the at least one water outlet (24) of the water engine or the water turbine is drained into a pressure-free area surrounding the water engine or the water turbine.

5. The method according to claim 1, wherein at least one water return line (38) is provided, and the water escaping from the at least one water outlet (24) of the water engine or the water turbine is returned to the water pressure source (2) via the water return line (38), and is discharged back to the water engine or the water turbine by said water pressure source (2).

6. The method according to claim 2, wherein a differential pressure regulating member (31) is arranged in the second compressed air line (30), by which differential pressure regulating member (31) the water pressure in the first water feed line (17) is determined, and the pressure level of the compressed air fed to the additive conveying device (28) is adjusted based on the determined water pressure.

7. The method according to claim 1, wherein a second additive reservoir unit (32) with a second additive conveying device (33) and a second additive reservoir (34) with a second additive (35) accommodated therein is provided, and the compressed air is fed and driven from the compressor (6) to the second additive conveying device (33) via a third compressed air line (36), and in this process, the second additive (35) is taken from the second additive reservoir (34) and conveyed to the first mixing device (8) via a second additive line (37).

8. The method according to claim 1, wherein the volume flow of the liquid-foam mixture fed to the second mixing chamber (11) of the second mixing device (10) is adjusted manually and/or pneumatically.

9. The method according to claim 1, wherein the water is discharged from the water pressure source (2) with a pressure value selected from a pressure value range with a lower limit of 6 bar and an upper limit of 20 bar.

10. The method according to claim 1, wherein the water engine or the water turbine is fed the water with a volume flow selected from a volume flow value range with a lower limit of 400 l/min, and an upper limit of 2,000 l/min.

11. A liquid mixing system (1) for providing a liquid-foam mixture, which is formed by mixing water with at least one additive (4), the liquid mixing system (1) comprising a water pressure source (2) configured for discharging water, at least one first additive reservoir unit (3) configured to accommodate a first additive (4), an air compressor unit (5) comprising a compressor (6) and a drive device (7), wherein the drive device (7) is drive-connected to the compressor (6), and wherein the air compressor unit (5) is configured to provide compressed air, a first mixing device (8) with a first mixing chamber (9), wherein the first mixing device (8) is configured to admix at least the first additive (4) to the water discharged from the water pressure source (2), a second mixing device (10) with a second mixing chamber (11), wherein the second mixing device (10) is configured to optionally admix compressed air to the liquid-foam mixture discharged from the first mixing device (8), and a connecting line (12) connecting the first and second mixing devices (8) to one another, a discharging unit (13) with a connection device (14) and a discharge line (15), wherein the discharge line (15) line-connects the connection device (14) to the first and second mixing devices (8, 10), wherein the discharging unit (13) is configured to discharge the liquid-foam mixture, a water line network (16) with at least one first water feed line (17), wherein the first water feed line (17) line-connects the first mixing device (8) to the water pressure source (2), an additive line network (18) with at least one first additive line (19), wherein the first additive line (19) line-connects the first additive reservoir unit (3) to the first mixing device (8), a compressed air line network (20) with a first compressed air line (21), wherein the first compressed air line (21) optionally line-connects the second mixing device (10) to the compressor (6), wherein the drive device (7) of the air compressor unit (5) is formed by a water engine or a water turbine comprising at least one first water inlet (23) and at least one water outlet (24), a second water feed line (25) is provided, and the at least one water inlet (23) of the water engine or the water turbine is line-connected to the water pressure source (2) via the second water feed line (25), wherein the water engine or the water turbine can be driven by the pressurized water of the water pressure source (2) to be discharged from the water pressure source (2).

12. The liquid mixing system (1) according to claim 11, wherein furthermore, a first additive conveying device (28), a first additive reservoir (29) at the first additive reservoir unit (3) for accommodating the first additive (4), and a second compressed air line (30) are provided, wherein the second compressed air line (30) line-connects the compressor (6) is line-connected to the first additive conveying device (28) of the first additive reservoir unit (3), and wherein the first additive reservoir (29) is line-connected to the first mixing device (8) via the first additive conveying device (28) and the first additive line (19).

13. The liquid mixing system (1) according to claim 11, wherein the water pressure source (2) is selected from the group of water reservoir having a water pump, open body of water and water pump, hydrant, a water reservoir applied with a pressure medium.

14. The liquid mixing system (1) according to claim 11, wherein the at least one water outlet (24) of the water engine or the water turbine opens to a pressure-free area surrounding the water engine or the water turbine.

15. The liquid mixing system (1) according to claim 11, wherein the water line network (16) comprises at least a first water return line (38), wherein the first water return line (38) line-connects the at least one water outlet (24) of the water engine or the water turbine to the water pressure source (2).

16. The liquid mixing system (1) according to claim 12, wherein a differential pressure regulating member (31) and a measuring line (45) are provided, which differential pressure regulating member (31) is arranged in the second compressed air line (30), and the measuring line (45) is line-connected to the first water feed line (17) starting from the differential pressure regulating member (31), and wherein the differential pressure regulating member (31) is configured to determine the water pressure in the first water feed line (17), and the pressure level of the compressed air fed to the additive conveying device (28) is adjustable based on the determined water pressure.

17. The liquid mixing system (1) according to claim 11, wherein a second additive reservoir unit (32) with a second additive conveying device (33) and a second additive reservoir (34) for accommodating a second additive (35) is provided, and that wherein the compressor (6) is line-connected to the second additive conveying device (33) via a third compressed air line (36), and furthermore, the second additive reservoir (34) is line-connected to the first mixing device (8) via the second additive conveying device (33) and a second additive line (37).

18. The liquid mixing system (1) according to claim 11, wherein the first mixing device (8) is formed by a Venturi nozzle arrangement.

19. The liquid mixing system (1) according to claim 11, wherein the second mixing device (10) comprises an actuator member (39), which actuator member (39) is configured to adjust the volume flow of the liquid-foam mixture fed to the second mixing chamber (11) of the second mixing device (10).

20. The liquid mixing system (1) according to claim 11, wherein the liquid mixing system (1) is mounted on a base frame (42) as a compact assembly unit.

* * * * *